US009430626B1

(12) United States Patent
Rome et al.

(10) Patent No.: US 9,430,626 B1
(45) Date of Patent: Aug. 30, 2016

(54) USER AUTHENTICATION VIA KNOWN TEXT INPUT CADENCE

(71) Applicant: Intensity Analytics Corporation, Warrenton, VA (US)

(72) Inventors: John D. Rome, Warrenton, VA (US); Bethann G. Rome, Warrenton, VA (US); Thomas E. Ketcham, II, Warrenton, VA (US)

(73) Assignee: Intensity Analytics Corporation, Warrenton, VA (US)

( * ) Notice: Subject to any disclaimer, the term of this patent is extended or adjusted under 35 U.S.C. 154(b) by 0 days.

(21) Appl. No.: 14/052,562

(22) Filed: Oct. 11, 2013

Related U.S. Application Data

(60) Provisional application No. 61/712,718, filed on Oct. 11, 2012.

(51) Int. Cl.
*G06F 21/32* (2013.01)
*G06F 21/31* (2013.01)
*G06F 3/023* (2006.01)

(52) U.S. Cl.
CPC ............. *G06F 21/32* (2013.01); *G06F 21/316* (2013.01); *G06F 3/023* (2013.01)

(58) Field of Classification Search
CPC ....... G06F 3/023; G06F 21/32; G06F 21/316
See application file for complete search history.

(56) References Cited

U.S. PATENT DOCUMENTS

| | | | | |
|---|---|---|---|---|
| 4,621,334 A * | 11/1986 | Garcia | ........................... | 382/115 |
| 4,805,222 A * | 2/1989 | Young et al. | ................. | 382/115 |
| 5,557,686 A * | 9/1996 | Brown et al. | ................. | 382/115 |
| 6,151,593 A * | 11/2000 | Cho | ........................ | G06F 21/32 706/16 |
| 6,442,692 B1 * | 8/2002 | Zilberman | ..................... | 713/184 |
| 2004/0034788 A1 * | 2/2004 | Ross | ..................... | G06F 21/316 713/193 |
| 2004/0059950 A1 * | 3/2004 | Bender et al. | ................. | 713/202 |
| 2004/0187037 A1 * | 9/2004 | Checco | .................... | G06F 21/31 726/7 |
| 2006/0280339 A1 * | 12/2006 | Cho | .................... | G07C 9/00158 382/115 |
| 2008/0028231 A1 * | 1/2008 | Bender | .......................... | 713/186 |
| 2008/0209229 A1 * | 8/2008 | Ramakrishnan et al. | ..... | 713/186 |
| 2009/0134972 A1 * | 5/2009 | Wu, Jr. | .................... | G06F 21/31 340/5.82 |
| 2012/0098750 A1 * | 4/2012 | Allen et al. | .................... | 345/169 |
| 2013/0347099 A1 * | 12/2013 | Smith | ..................... | G06F 21/32 726/19 |

OTHER PUBLICATIONS

Chok, Nian Shong (2010) Pearson's Versus Spearman's and Kendall's Correlation Coefficients for Continuous Data. Master's Thesis, University of Pittsburgh.*

(Continued)

*Primary Examiner* — Robert Leung
(74) *Attorney, Agent, or Firm* — Schwegman Lundberg & Woessner, P.A.

(57) ABSTRACT

A system, method, and computer-readable storage device for receiving data representative of an input sample comprising a user's motion while entering information into a data input device, calculating a statistical summary of the input sample representative data, and comparing, using geometric and geospatial constructs, the calculated statistical summary of the input sample representative data to statistical summaries of representative data of previous input samples in a stored profile of a selected user to generate an indication whether the user is the selected user.

20 Claims, 8 Drawing Sheets

(56) References Cited

OTHER PUBLICATIONS

R. Joyce and G. Gupta (1990) Identity Authentication Based on Keystroke Latencies. Communications of the ACME, Feb. 1990, vol. 33, No. 2. pp. 168-176.*

F. Monrose and A. D. Rubin (2000) Keystroke dynamics as a biometric for authentication. Future Generation Computer Systems 16, pp. 351-359.*

* cited by examiner

USER AUTHENTICATION VIA KNOWN TEXT INPUT CADENCE

CLAIM OF PRIORITY

This patent application claims the benefit of priority, under 35 U.S.C. Section 119(e), to U.S. Provisional Patent Application Ser. No. 61/712,718, filed on Oct. 11, 2012, which is hereby incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2013, Intensity Analytics, Inc. All Rights Reserved.

BACKGROUND

As people's work and personal lives become increasingly dependent upon computing devices and information networks, authenticating users who seek to access computing devices, computer networks, and computer services becomes increasingly important.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings, in which.

DESCRIPTION OF EMBODIMENTS

Figure 1:
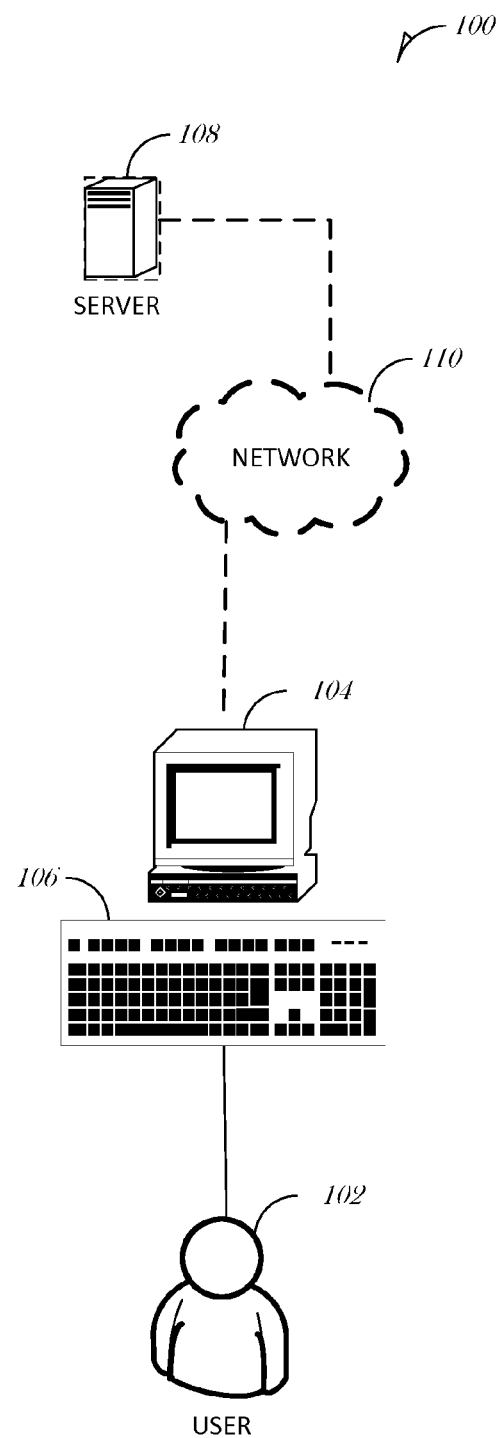
FIG. 1 is a system diagram illustrating a system for user authentication via input of known text, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

For the purposes of this document, an "effort" is a single human movement, either to press one key on a keyboard, or to move a mouse or finger/hand (in one unbroken and continuous movement) across a screen, track pad, or tablet PC. The term "efforts" represents a temporally-associated effort collection, which is created as a part of one logically-connected undertaking, however long or short in duration (e.g., typing a password, typing a paragraph, or even typing a whole treatise, or when moving the mouse from one location to another, or during a set of finger/hand movements that results in a "drawing," however simple or complex).

Various embodiments authenticate users using the cadence and habit of users' motions during input of data into an input device. In various embodiments, the input device may be a computer keyboard, a computer mouse, a trackball, a touchpad, a pointing stick, a digital pen, a touchscreen, a capacitive sensing device, or various combinations thereof. Whenever a user enters information into one of these input devices, the user makes a series of small muscle movements; the metrics surrounding these small muscle movements comprise unique, individual, and highly distinctive patterns. These patterns can be captured during the normal course of the user's input into the input device, statistics of these patterns can be calculated, those statistics can be compared to statistics of previous inputs by the user, and parameterized analysis of the statistical comparisons can be used to authenticate the user. Various embodiments disclosed herein involve determining whether a single sample test string statistically matches a cluster of previously accumulated strings stored in a previously collected cadence and habit library (a.k.a., "PCCHL") associated the user.

When a user types a key on a keyboard, three different events may be generated in sequence: a KeyDown event, which occurs when the user depresses the key, a KeyPress event, which occurs when the depressed key is a character key, and a KeyUp event, which occurs when the user releases the key. Each of these events may also have a corresponding time, measured in "ticks." Each "tick" may equate to roughly 100 nanosecond intervals.

Previous methods of authenticating users through keyboarding habits have focused primarily on the basic keyboard measurements of dwell time and flight time. "Dwell time" is the simple calculation of KeyUp minus KeyDown times for each character. "Flight time" is the calculation of time from the previous KeyUp to the next KeyDown event. These basic calculations are often referred to as "hallmark data".

When a user types a typing sample on a keyboard, a large amount of data may be collected. The amount of data, along with selected combinations of hallmark data, and the disparate sizes of even apparently similar keyboard activities can make traditional numerical comparisons between two typing samples difficult, and conclusions about the identity of their respective users statistically unreliable.

Due to the vagaries of humans' small-muscle movements, no single user ever types the same string in exactly the same manner. As a result, a major difficulty in comparing two typing samples is that their component descriptive numerics might not mathematically be the same—but they may be relatively close. Thus, when statistical summaries of this data are abstracted into points in a three-dimensional Euclidean space, a given user, when repeatedly typing an identical and familiar text string, will create points that form relatively well-defined clusters. The more highly grouped the points in a cluster (i.e., the more cohesive the typing efforts which created all of the points in the cluster), the denser the "ball". As with physical mass, the more tightly packed its elements are, and the more of those elements there are in the ball, and the closer a rogue "asteroid" (the typing effort in a single sample) is to that ball, the greater the attraction. The attraction is directly proportional to the likelihood that the sample's typist, and the typist of the PCCHL, is the same user.

The goal is to authenticate a given user by comparing the current typing of a string of characters with a set of matching entries of the same strings contained in the user's profile within the PCCHL. The entries in the user's profile can either be created all at once in an initial enrollment effort, or can be accumulated over time in a heuristic operation. In either case, after a sufficient number of entries have been typed, the user's profile within the PCCHL is deemed ready for use in comparisons. Statistical sufficiency (i.e., enough to declare a match) is defined in a tuning process. Metaphorically, during the tuning phase the user throws "darts" of identically-typed text strings at an imaginary "dartboard" that, optionally, can either be shown to the user, or can be assembled inconspicuously. When enough of the strings have clustered about the center of the dartboard, the PCCHL becomes useful.

As a user types a typing sample, various aspects of the cycling of each qualifying key typed by the user can be captured and stored. The aspects can be expressed as a combination of labels accompanied by timestamps. In various embodiments, the labels can be encrypted. In various embodiments, the timestamps can be 100-nanosecond timestamps.

To account for differences between platforms and clock times, each typing sample can be examined as if it begins from a time zero origin corresponding to the first KeyDown event of the sample, with each successive event measured as an offset from that origin. For example, the actual events might happen at times 1000, 1293, and 1462, but these times may be evaluated as times 0, 293, and 462. This time offset is referred to as "time-zero elapsed time."

"Inter-letter time" is the defined as the overlap between the interval between the KeyPress and KeyUp events of a character in a sample and the interval between the KeyPress and KeyUp events of the next character in the sample. For example, a typing sample may contain the substring "dog". The user's typing of the substring may be such that the KeyPress event of the letter 'o' occurs during the interval between the KeyPress event and the KeyUp event of the letter 'd', e.g., KeyPress-'d': 0, KeyPress-'o': 216, KeyUp-'d': 248, KeyUp-'o': 497. The inter-letter time between the character pair 'd' and 'o' in this sample substring would be 248-216=32 ns.

The timing data accumulated in a current typing effort can be compared with the timing data stored in the user's profile within the PCCHL. In various embodiments, a match can only occur if the text strings are identical. If the text is identical, the timing data can be examined to generate a variety of measurement results, including average hang time, average space between last KeyUp and next KeyDown across characters, average space between last KeyUp and next KeyUp across characters, event overlaps between characters, control character positions (e.g., CTRL, Shift, ALT, Num Lock, Backspace, etc.). Each of these can be measured by total count, average, coefficient of variance, average deviation, and standard deviation. Furthermore, additional statistics can be provided for graphing, including the number of previous samples collected that compose the profile, the inclusion circle for diagramming a two-dimensional vector chart, and scale information for showing a relationship between the profile information (presented as a cluster of dots) and the currently evaluated sample.

In various embodiments, the timing data can be examined to generate an indication of a match between the typist and the selected user. The indication may comprise a statistical opinion about the overall quality of the identity of efforts, as well as a variety of other measurement results. In various embodiments, the statistical opinion may be a simple "yes" or "no". In various embodiments, the statistical opinion may be a confidence value, a confidence percentage, etc.

In various embodiments, the statistical opinion can have three components: a Boolean yes/no conclusion, a set of rollup statistics composed of certainty and a confidence value measuring the certainty, and a set of detailed statistics.

In various embodiments, a third-party service can be responsible for comparing the current text with the PCCHL text. In various embodiments, the responsibility to compare the current text with the PCCHL text can be left to the calling host. In such embodiments, the confidentiality of the current text and PCCHL text can be under the control of the calling host at all times. In such embodiments, the "calling host" refers to an application or process that employs a cadence authentication process in this disclosure. Such "calling hosts" can authenticate a set of credentials using conventional authentication techniques. For example, an application might first use a database of stored usernames and passwords to validate that the user entered the correct username and password combination, and then use a cadence authentication process as a second authentication factor.

In various embodiments, the calling host is responsible for determining what action to take, if any, based on the outcome of a comparison of the current typing sample to the user's PCCHL.

These techniques are used when comparing the identity of a user making Efforts to: (1) type known text (requiring an exact character match) which can be compared against that user's PCCHL of that same text; or (2) move a mouse, or make finger/hand gestures, resulting in combinations of time durations, start-stop locations, and changes in direction during recorded movements composing one "drawing," which can be compared against that user's PCCHL.

"Known text" is any predetermined, n-length invariant string of computer key codes that are created using a standard English keyboard in one continuous, non-stop burst of typing, however fast.

A combination of selected time-zero elapsed times, key release times, and inter-letter times are assembled and then metamorphosed into a single point in a three-dimensional Euclidean space, which bounds all known efforts of a selected user typing a given string. A collection of all of the points in the selected user's PCCHL form a planet-like cluster, which is then deemed to have "astronomy-esque" gravitational properties. Subsequent single test strings are then caused to "fly by" that cluster. Various statistics representing the force of "gravity" between the sample's point and the barycenter of the cluster of the points in the PCCHL can be computed. These statistics can be used to produce an indicator of similarity between the sample and the user's PCCHL. These statistics can also be used to produce other supporting statistical information, which can represent the reliability of the similarity indicator. The reliability may be in the form of a confidence interval.

In various embodiments, each sample can have a set of "component dots". Each "component dot" can represent a position for a key event for a character in the sample. Joining these dots together for the current typing sample and each typing sample in the selected user's stored PCCHL can facilitate displaying a visual representation of how "close" the current typing sample is to the typing samples in the selected user's stored PCCHL.

Figure 8:
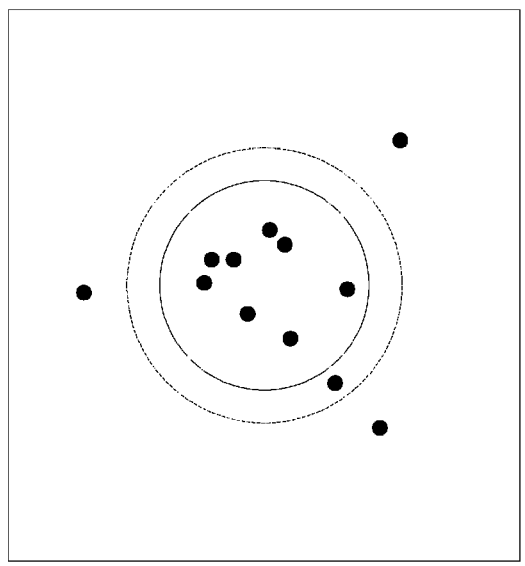
FIG. 8 is a diagram illustrating a visual representation of a tuning process for user authentication via input of known text, in accordance with some embodiments.

In various embodiments, a graphical line connecting the current typing sample's component dots relative to the clusters for each typing sample in the selected user's PCCHL can visually illustrate the user's typing consistency. In various embodiments, the visual illustration may be at least one of a three-dimensional graphic, a Euclidean graphic, a vector graphic, a line graphic, an intersection graphic, and a mashup graphic. See FIG. 8 for an example. In various embodiments, the visual illustration can display a relationship between the provided typing sample and the typing samples in the selected user's PCCHL; i.e., the visual illustration can quickly display an authentication attempt that is statistically "close enough" versus an authentication attempt that represents an imposter. Such illustrations can help non-mathematically-trained investigators with an ability to understand at a glance the complex results of the cadence authentication process.

In various embodiments, a secondary measure of fit can also be produced. In various embodiments, the secondary measure of fit may be produced using two-dimensional vector geometry. In such embodiments, measurements taken from previously recorded typing samples can be rolled up into points on a Cartesian plane. One or more concentric rings, each representing a coefficient of variance, can be computed and centered on the midpoint of all of the calculated points, which can be derived from the entries in the PCCHL. A unique calculated point, or dot, can be produced from the user's current typing sample. The radius of that dot from the midpoint of the PCCHL points establishes the confidence interval of the current typing sample. The position of the PCCHL points relative to the rings can display a picture of the user's typing consistency; this picture can be useful for tuning the comparison process.

Hallmarks: Various embodiments successfully addresses the Curse of Dimensionality in mathematics (i.e., evaluating and reliably comparing very large quantities of substantially similar, but numerically different, 'clouds' of numbers, each of different sizes, and then 'seeing' similarities, indeed much as an observer can successfully separate and group atmospheric cloud formations into, say, cumulonimbus and altostratus, even though no two clouds have ever been identical. A developed similarity determination is sufficiently accurate to reliably validate efforts that were created by the same user, while allowing for the vagaries of normal human variance without an unacceptable number of false negatives, yet not so permissive as to allow false positives.

Privacy and Usage: Immediately after performing the needed calculations, all original user content can be flushed. In various embodiments, the PCCHL libraries only contain matrices of numbers, which cannot be reverse-engineered to reveal source content. The application of this technology would normally be in the role of a preferred second-factor authentication tool for five reasons: (1) it cannot be spoofed in real-world environments; (2) it statistically outperforms other PC-based authentication approaches; (3) it is biometric; (4) it does not utilize Personally-Identifiable Information; and (5) it requires no special or non-standard hardware.

In various embodiments, a cadence capture component captures keystroke-timing data. In various embodiments, the cadence capture component can be a computer application, a computer service, or by a web application. The metrics can be distilled and separated from the content, to prevent the escape of any PII ("Personally Identifiable Information"). Those metrics can be shipped via web services to a cloud-based repository in an encrypted format. Given their dissociation from the source text, and the fact that only the typing effort statistics are retained, reverse-engineering the original text is extremely improbable.

For human analysis of the above intermediate observations and final conclusion, appropriate commentary can automatically be generated to aid the observer in understanding the results.

Throughout the entire cadence authentication process, the algorithms make use of geometric and geospatial constructs to solve the mathematical conundrum known as the Curse of Dimensionality (i.e., how can reliable comparisons be made from two separate 'clouds' of data, whose size and structure cannot be known in advance).

Coefficient of Variance can be calculated using the formula $$\frac{\sqrt{\frac{1}{N}\sum_{i=1}^{N}(x_i - \bar{x})^2}}{\frac{1}{n}\sum_{i=1}^{n}a_i}$$

Thus, as used in this document, coefficient of variance is essentially the standard deviation divided by the arithmetic mean.

Turning to the figures, FIG. 1 is a system diagram illustrating a system 100 for user authentication via input of known text, in accordance with some embodiments. The system 100 includes a user 102 and a computing device 104 with a keyboard 106, and may optionally include a server 108 interconnected via at least one network 110.

The computing device 104 may include, but is not limited to, devices such as a smartphone, cellular telephone, mobile phone, laptop computer, tablet computer, desktop computer, server, computer station, or computer kiosk. Although the keyboard 106 is illustrated in FIG. 1 as a physical keyboard, in some embodiments, the keyboard 106 may be a virtual keyboard, such as on a touchscreen or a capacitive-sensing device.

Although the server 108 is illustrated in FIG. 1 as a single machine, in some embodiments that include a server 108 interconnected via a network 110, the server 108 may comprise multiple servers working together as a colocated, distributed, or cloud-based system.

In various embodiments, the user 102 attempts to authenticate using keyboard 106. In various embodiments, data representing the typing of the user 102 using keyboard 106 is collected by computing device 104. In various embodiments, the cadence capture component and the cadence authentication algorithms execute entirely on computing device 104. In such embodiments, the computing device 104 may not need to communicate using network 110 to authenticate user 102 using cadence authentication algorithms. In various embodiments, computing device 104 executes the cadence capture component, but not the cadence authentication algorithms. In such embodiments, the computing device 104 sends the cadence information acquired from user 102 via keyboard 106, sends the cadence information to server 108 via network 110, and then receives an indication of a match via network 110.

Figure 2:
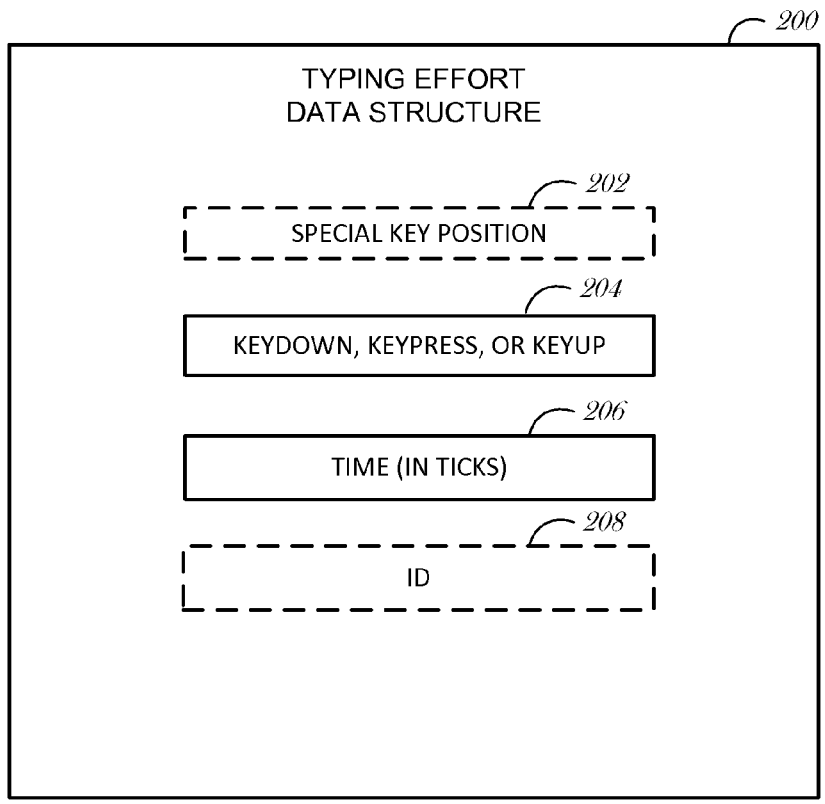
FIG. 2 is a data structure diagram illustrating a typing effort data structure creating during user authentication via input of known text, in accordance with some embodiments.

FIG. 2 is a data structure diagram illustrating a typing effort data structure 200 creating during user authentication via input of known text, in accordance with some embodiments. In various embodiments, a typing effort data structure 200 is created for each key event in the current typing sample.

In various embodiments, the typing effort data structure 200 includes a data structure 204, which represents one of the following events: KeyDown, KeyPress, or KeyUp. In various embodiments, data structure 206 represents the time in ticks of the event represented in 204.

In various embodiments, the typing effort data structure 200 may optionally include a special key position data structure 202. In various embodiments, the special key position data structure 202 represents a key stroke of a special key, such as a non-printable key (e.g., Shift, Alt, Ctrl, etc.).

In various embodiments, the typing effort data structure 200 may optionally include an ID data structure 208, which can contain a value representing the unique identity of the selected user in the PCCHL database. In various embodiments, the value of the ID data structure 208 can be a string, a number, a pointer or reference, or an abstract data structure such as an object. In various embodiments, the value of the ID data structure 208 unambiguously identifies the selected user, as whom the typist is attempting to authenticate. In various embodiments, the value of the ID data structure 208 is determined by the host application.

Figure 3:
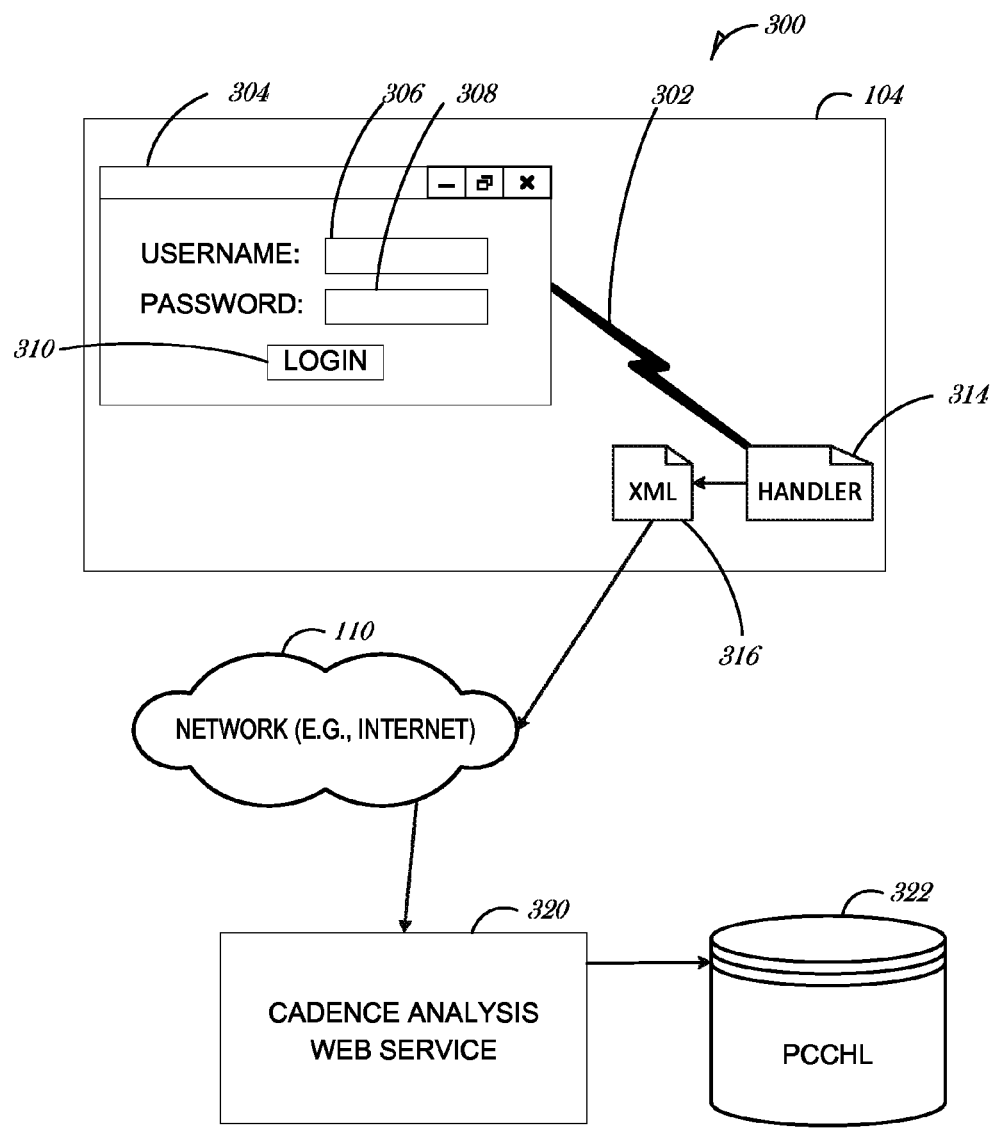
FIG. 3 is a system diagram illustrating an implementation of a system for user authentication via input of known text, in accordance with some embodiments.

FIG. 3 is a system diagram illustrating an implementation of a system 300 for user authentication via input of known text, in accordance with some embodiments.

In various embodiments, the system 300 comprises a computing device 104, a network 110, cadence analysis web service 320, and a PCCHL 322. In various embodiments, the computing device 104 can present an application 304 containing text input controls. In various embodiments, the application 304 is an application executing locally on computing device 104. For example, application 304 can be a native application compiled for the computer architecture of computing device 104 (e.g., a compiled C++ application), as well as an interpreted application compiled for a virtual architecture provided by a natively executing interpreter (e.g., a Java or Microsoft .NET application). In various embodiments, the application 304 is a web page.

In various embodiments, application 304 can display one or more text input controls. Users can engage the cadence authentication process by typing text into the text input controls. In various embodiments, the text input controls may be a username input control 306, a password input control 308, or both. In various embodiments, by preventing text from being pasted into the control, the text input controls may force users to enter text using an input device capable of capturing cadence information, (e.g., a computer keyboard).

In various embodiments, typing metrics can be collected while the user is typing text into the text input controls. In various embodiments, each key event 302 in the text input controls causes a handler 314 to receive or collect a typing effort data structure 200, as described in the description of FIG. 2. In various embodiments, the handler 314 can be a dynamically-linked library (i.e., DLL) or a form handler for a web page.

In various embodiments, when the user has finished typing text into one or more text input controls, the computing device 104 can send the collected typing metrics to the cadence analysis web service 320 via network 110 upon the user clicking, pushing, or otherwise selecting a button, such as a login button 310. In various embodiments, when the user has finished typing text into one or more text input controls, the computing device 104 can automatically send the collected typing metrics to the cadence analysis web service 320 via network 110 after a certain amount of time elapses. In various embodiments, the computing device 104 can automatically stream the typing metrics to the cadence analysis web service 320 via network 110 as the user is typing text into the input controls.

In various embodiments, when the handler 314 is ready to send collected typing metrics, the handler 314 creates an XML file 316 containing the collected typing metrics to be transmitted. In various embodiments, the handler 314 transmits the XML file 316 to the cadence analysis web service 320 via network 110. In various embodiments, the transmission can be done using web services.

In various embodiments, when the cadence analysis web service 320 receives the XML file 316 containing the collected typing metrics for the user's typing sample, the cadence analysis web service 320 can evaluate the typing metrics data in the XML file 316 against the selected user's profile stored in the PCCHL.

Two implementation approaches may be common: one for web applications and one for local applications. Many organizations, especially those that require extremely high levels of security (e.g., financial services, government, etc.) may choose an implementation in which all components of the cadence authentication system are under the control of the organization.

Local Implementation

Local applications use a wide variety of different authentication schemes, or do not use authentication at all. For applications that currently require a username and password, a small cadence authentication component (e.g., a Microsoft .NET DLL on Microsoft Windows) can be added to the local application. The small component will verify the typing metrics when the user enters their username and password. In cases where there is no security or the source code for the local application is not available, a cadence authentication service can operate as a background process, requiring the user to enter credentials or perform a gesture to access the application.

In various embodiments, where the cadence authentication component is added to the local application, the cadence authentication component provides event listeners that are bound to given data entry controls, and the cadence authentication component can provide web service access for the essential profile creation and evaluation functions.

After the cadence authentication component has been added to a desktop application for authentication, two operations are available: the process to test a current typing sample against a stored profile (a.k.a., "login"), and a different process to create a specific profile (a.k.a., "enrollment"). How these different operations are presented to the user can vary a great deal based on the host application. In some cases, the user can be required to create a profile using an enrollment module or even as part of a separate application, which can then be used with the login function. There are many different options for how the enrollment process can be implemented. For instance, a more complex option is to employ a passive enrollment operation, which builds a profile over time as the user accesses the system. In this case, both operations may be handled by the same process in the host application.

An example code handler using Microsoft VB.NET is listed below:

Example Code Handler (can be any modern language, programming references will vary by programming language and by computing platform):

```
Private CVMetrics As New
CVMetricsDLL.Operations(MyUserNameTextbox, MyPasswordTextbox)
Private Sub Login_Click(ByVal sender As System.Object, ByVal e As
System.EventArgs) Handles Login.Click
    Try
        If IsValidUser(MyUserNameTextbox.Text,
MyPasswordTextbox.Text) = True Then
            If CVMetrics.CompareSample(MyUserNameTextbox.Text,
CVMetrics.CurrentData) = True Then UserIsAuthenticated = True
        End If
        CVMetrics.ClearData
    Catch ex As Exception
        ErrHandler(ex)
    End Try
End Sub
```

Web Implementation

Today, most secure websites require a username and password for access. When a user submits these credentials, the website verifies the credentials against a database to verify they match a record in the database. In various embodiments, adding cadence authentication can be as simple as including a small script payload with the login web page, and referencing a web service on the server side. In such embodiments, when the user navigates to that same login page, everything will appear the same as before, except when the user types a username and password, the user's typing metrics will be verified as well.

In various embodiments, there can be two components to add cadence authentication to a web application. In various embodiments, a jQuery-based component must be included in the page using a standard <script> tag in the header section along with a hidden field for storing temporary data. This component will pass a string containing compressed metadata about the input process as part of the form submission. The form handler routine for the page will pass this metadata to a web service, which will return information about the result.

Once cadence authentication has been added to a web application, there are two operations involved: the process to test a given input against a stored profile (login), and a different process to create a specific profile (enrollment). In the example code below, the two operations are handled on different web pages. In embodiments corresponding to the example code below, the user would be required to create a profile using the enrollment page, which can then be used with the login page. There are many different options for how the enrollment process can be implemented. For example, a more complex option is to employ a passive enrollment operation, which builds a profile over time as the user accesses the system. In this case, both enrollment and login would be handled by the same web page. h

```
<html>
    <head runat="server">
        <script src="jquery-1.7.2.min.js"
            type="text/javascript"> </script>
        <script src="cvmetrics.js" type="text/javascript" />
    </head>
    <body>
        <form id="frmLogin" runat="server">
            Username: <asp:TextBox ID="txtLogin" runat="server" />
            Password: <asp:TextBox ID="txtPwd" runat="server" />
            <asp:Button ID="btnLogin" runat="server" Text="Login"
                OnClientClick="return populateControlWithKeyData(
                    'txtPwd','CVMetricsData');" />
            <input type="hidden" id="CVMetricsData" />
        </form>
        <script type="text/javascript">
            cvmBindControl('txtPwd', bandType.Narrowband);
        </script>
    </body>
</html>
```

Example Code Handler (login):

private void btnLogin_Click(object sender, EventArgs e)

```
{
    try {
        //-- Usually, CVMetrics is called after the user --
        //-- credentials have been verified as normal. --
        //-- Get the CVMetrics data from the hidden --
        //-- field value(s). --
        string RawCVMData = hfPassword.Value.ToString;
        //-- Call to the CVMetrics web service --
        using (nbServices.narrowband nb = new
            nbServices.narrowband( )) {
            //-- Create the variables to hold the results --
            //-- from the evaluation. --
            bool Match = false;
                double Fidelity = 0;
                double Confidence = 0;
                DataTable dtStatistics = new DataTable( );
                dtStatistics.TableName = Guid.NewGuid( ).ToString( );
                string Result = nb.EvaluateSampleWithGraphs(
                    CVMLicenseKey,
                    txtLogin.Text.Trim,
                    RawCVMData,
                    Match,
                    Fidelity,
                    Confidence,
                    dtStatistics);
            if (Result == string.Empty) {
                //-- The Match value returns a Boolean result --
                //-- Other values contain statistical detail. -- } else {
                //-- Any error message is in the Result value --
            }
        }
    } catch (Exception ex) {
        //-- Error handling --
    }
}
<html>
    <head runat="server">
        <script src="jquery-1.7.2.min.js"
            type="text/javascript"></script>
        <script src="cvmetrics.js" type="text/javascript" />
    </head>
    <body>
        <form id="frmEnrollment" runat="server">
            Username: <asp:TextBox ID="txtLogin" runat="server" />
            Password: <asp:TextBox ID="txtPwd" runat="server" />
            <asp:Button ID="btnSubmit" runat="server"
Text="Login"
                OnClientClick="return populateControlWithKeyData(
                    'txtPwd','CVMetricsData');" />
            <br />
            <asp:Image ID="imgInclusion" runat="server"
                Visible="false"></asp:Image>
            <input type="hidden" id="CVMetricsData" />
        </form>
        <script type="text/javascript">
            cvmBindControl('txtPwd', bandType.Narrowband);
```

-continued

```
        </script>
      </body>
    </html>
```

Example Code Handler (enrollment):

```
private void btnSubmit_Click(object sender, EventArgs e)
{
  try {
    //-- Get the CVMetrics data from the hidden --
    //-- field value(s). --
    string RawCVMData = hfPassword.Value.ToString;
    //-- Call to the CVMetrics web service --
    using (nbServices.narrowband nb = new
        nbServices.narrowband( )) {
      //-- Create the variables to hold the results --
      //-- from the evaluation. --
      string InclusionImageData = string.Empty;
        DataTable dtStatistics = new DataTable( );
        dtStatistics.TableName = Guid.NewGuid( ).ToString( );
        string Result = nb.SaveProfileWithGraphs(
          CVMLicenseKey,
          txtLogin.Text.Trim,
          RawCVMData,
          200,
          200,
          InclusionImageData,
          dtStatistics);
      if (Result == string.Empty) {
        //-- The datatable contains statistical detail. --
        //-- This example displays a graph result. --
        string InclusionImage =
            string.Format("/charts/{0}.png",
            Guid.NewGuid( ).ToString( ));
        Base64ToImage(InclusionImageData).Save(
            Server.MapPath(InclusionImage),
            ImageFormat.Png);
        imgInclusion.ImageUrl = InclusionImage;
        imgInclusion.Visible = true;
        } else {
        //-- Any error message is in the Result value --
        }
      }
    } catch (Exception ex) {
      //-- Error handling --
    }
}
```

Figure 4:
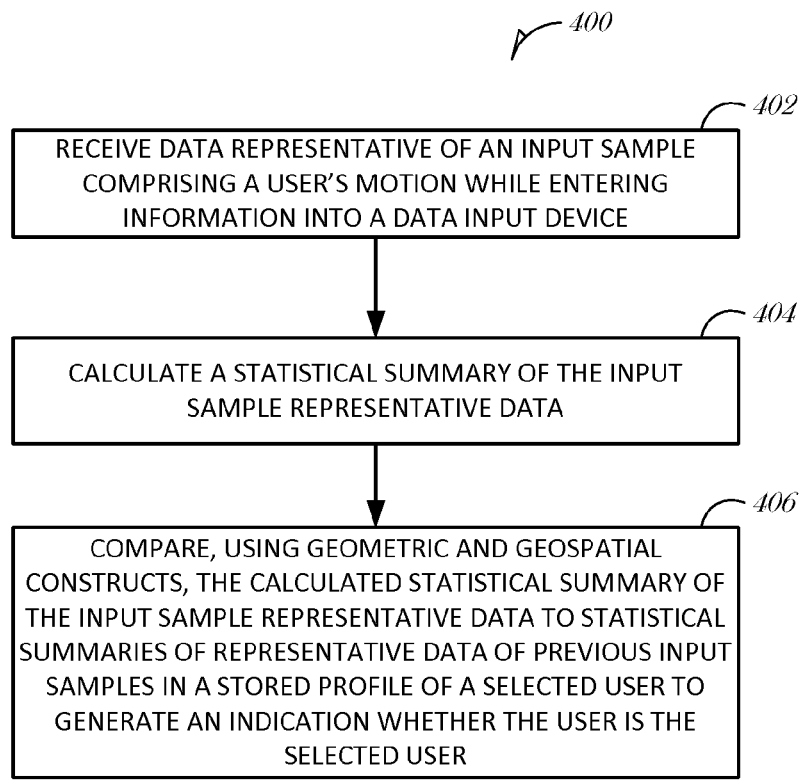
FIG. 4 is a flowchart illustrating a method for user authentication via input of known text, in accordance with some embodiments.

FIG. 4 is a flowchart illustrating a method 400 for user authentication via input of known text, in accordance with some embodiments. At 402, data representative of an input sample is received, the input sample comprising a user's motion while entering information into a data input device. In various embodiments, the input device may be a computer keyboard, a computer mouse, a trackball, a touchpad, a pointing stick, a digital pen, a touchscreen, a capacitive sensing device, or some combination thereof.

At 404, a statistical summary of the input sample representative data is calculated.

At 406, the calculated statistical summary of the input sample representative data is compared to statistical summaries of representative data of previous input samples in a stored profile of a selected user to generate an indication whether the user is the selected user.

Figure 5:
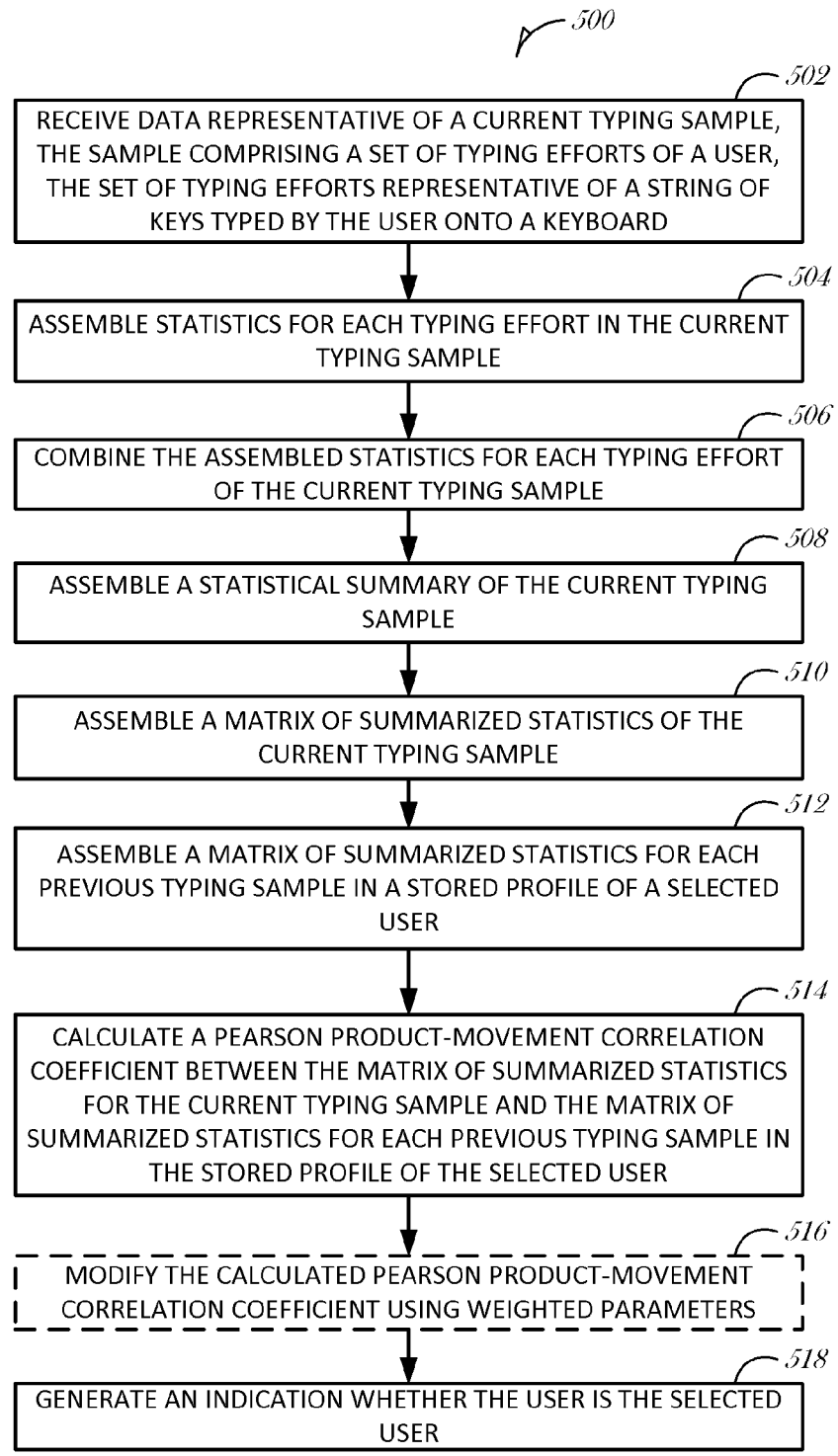
FIG. 5 is a flowchart illustrating a method for user authentication via input of known text, in accordance with some embodiments.

FIG. 5 is a flowchart illustrating a method 500 for user authentication via input of known text, in accordance with some embodiments.

At 502, data representative of a current typing sample is received, the sample comprising a set of typing efforts of a user, the set of typing efforts representative of a string of keys typed by the user onto a keyboard.

At 504, statistics are assembled for each typing effort in the current typing sample. At 506, the assembled statistics for each typing effort of the current typing sample are combined. At 508, a statistical summary of the current typing sample is assembled. At 510, a matrix of summarized statistics of the current typing sample is assembled.

At 512, a matrix of summarized statistics for each previous typing sample in a stored profile of a selected user is assembled.

At 514, a Pearson product-moment correlation coefficient is calculated between the matrix of summarized statistics for the current typing sample and the matrix of summarized statistics for each previous typing sample in the stored profile of the selected user. A Pearson product-moment correlation coefficient can be calculated using the formula $$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}$$

In an example of calculating a Pearson product-moment correlation coefficient, X is an array of average times between KeyUp and KeyDown events by character for the current typing sample, Y is an array of average times between KeyUp and KeyDown events by character for the typing samples in the selected user's stored profile, and N is the length of the arrays.

At 516, optionally, the calculated Pearson product-moment correlation coefficient is modified using weighted parameters. In various embodiments, the parameters are configured externally.

At 518, an indication whether the user is the selected user is generated.

Figure 6:
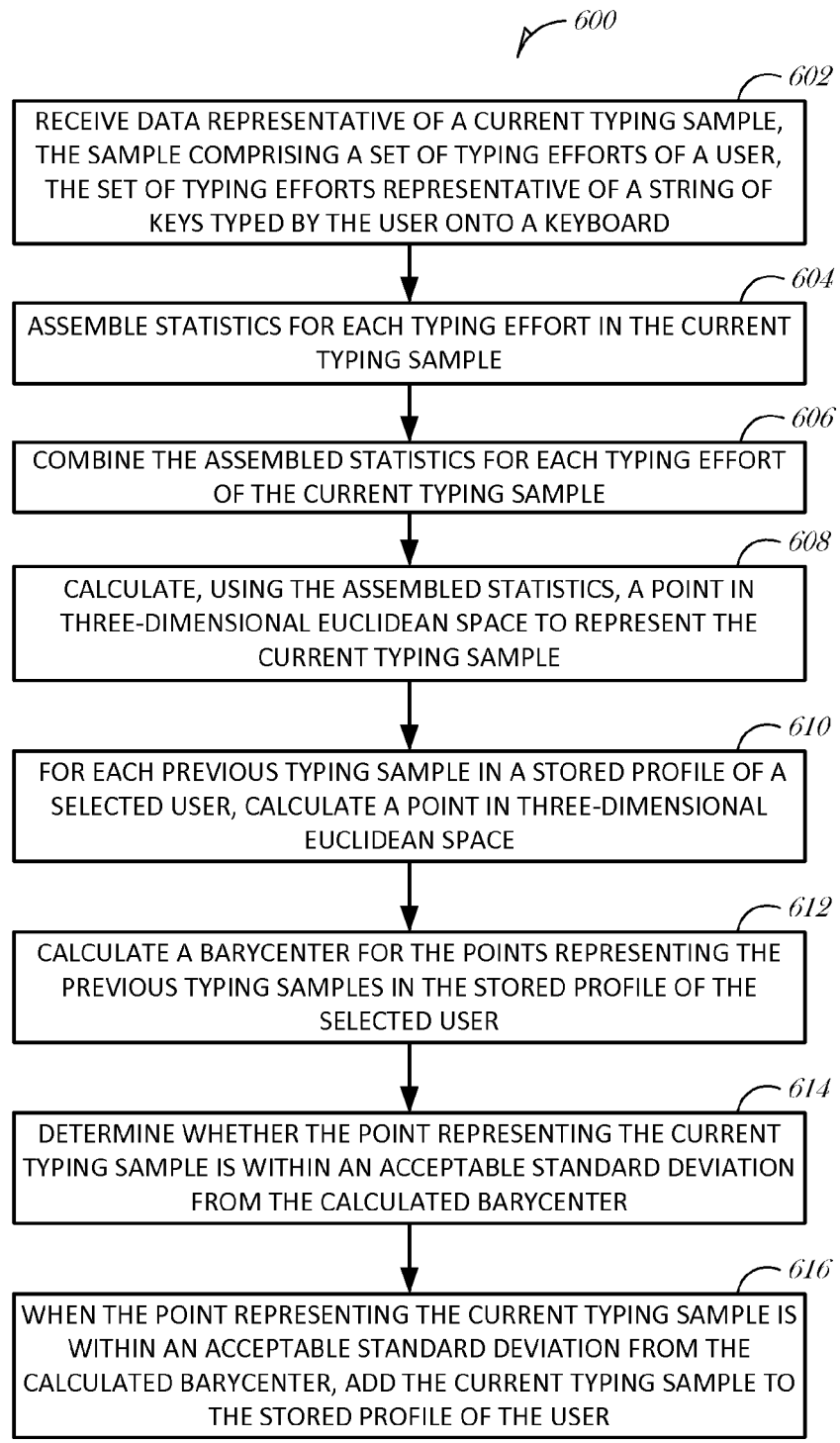
FIG. 6 is a flowchart illustrating a method for adding a typing sample to a user's stored profile, for use in user authentication via input of known text, in accordance with some embodiments.

FIG. 6 is a flowchart illustrating a method 600 for adding a typing sample to a user's stored profile, for use in user authentication via input of known text, in accordance with some embodiments.

At 602, data representative of a typing sample is received, the sample comprising a set of typing efforts of a user, the set of typing efforts representative of a string of keys typed by the user onto a keyboard.

At 604, statistics are assembled for each typing effort in the typing sample.

At 606, the assembled statistics for each typing effort of the typing sample are combined.

At 608, a point in three-dimensional Euclidean space is calculated using the assembled statistics, the point to represent the current typing sample.

At 610, a point in three-dimensional Euclidean space is calculated for each previous typing sample in a stored profile of a selected user.

At 612, a barycenter is calculated for the points representing the previous typing samples in the stored profile of the selected user. A barycenter can be calculated using the formula $$R = \frac{1}{M}\sum_{i=1}^{n} m_i r_i$$

The barycenter can be considered a conceptual center of mass represented by the collection of data points relating to a given character within the samples that compose a selected user's profile. In an example, the individual points are represented by the coordinates of $r_i$, thus, the mass (m) is a fixed value, so the sum (M) of the mass is equivalent to the number of points relating to the given character in the selected user's stored profile. Once the barycenter has been calculated, the barycenter can be used as a reference to calculate force (F) and torque (T), using the formulas $$F = \int_V f(r) = \int_V \rho(r) dV(-g\vec{k}) = -Mg\vec{k}$$

and $$T = \int_V (r-R) \times f(r) =$$
$$\int_V (r-R) \times \left(-g\rho(r) d V\vec{k}\right) = \left(\int_V \rho(r)(r-R) dV\right) \times \left(-g\vec{k}\right)$$

respectively, where:
V is volume of the body (profile values),
ρ(r) is the computed density at each point r in the volume,
g is the acceleration of gravity,
k is a unit vector defining a vertical direction,
d is the mass at the point r,
f is the force at each point r,
R is the reference point for the Torque calculation,
F is the computed Force, and
T is the computed Torque (0 at the center of mass).

The conceptual force of "gravity" between the point representing the current typing sample and the barycenter of the cluster of points from previous typing samples can be calculated using the formula $$F = G\frac{m_1 m_2}{r^2}$$

At 614, whether the point representing the current typing sample is within an acceptable standard deviation from the calculated barycenter is determined.

At 616, the current typing sample is added to the stored profile of the user when the point representing the current typing sample is within an acceptable standard deviation from the calculated barycenter.

Figure 7:
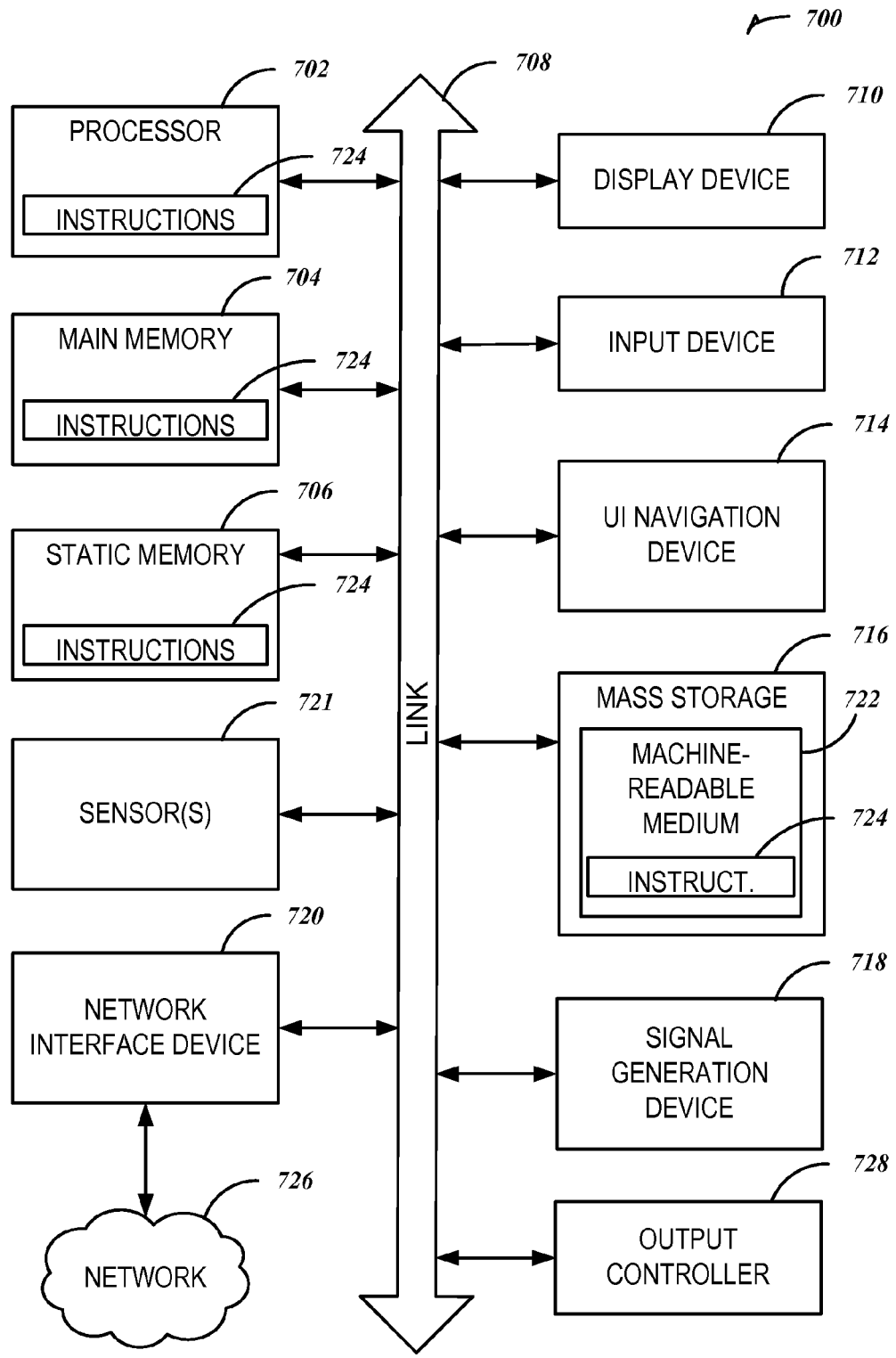
FIG. 7 is a block diagram illustrating a machine in the example form of a computer system, within which a set or sequence of instructions for causing the machine to perform any one of the methodologies discussed herein may be executed, in accordance with some embodiments.

FIG. 7 illustrates a functional block diagram of an example machine 700, in accordance with some embodiments, upon which any one or more of the techniques (e.g., methodologies) discussed herein can perform. In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 700 can include a hardware processor 702 (e.g., a central processing unit (CPU), a graphics processing unit (GPU), a hardware processor core, or any combination thereof), a main memory 704 and a static memory 706, some or all of which can communicate with each other via a bus 708. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR)) connection to communicate or control one or more peripheral devices (e.g., a printer, card reader, etc.)

The storage device 716 can include a machine-readable medium 722 on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 can constitute machine-readable media.

Although the machine-readable medium 722 is illustrated as a single medium, the term "machine-readable medium" can include a single medium or multiple media (e.g., a centralized or distributed database, and/or associated caches and servers) that configured to store the one or more instructions 724.

The term "machine-readable medium" can include any tangible medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Although example machine 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 700 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 700 may include one or more processors and may be configured with instructions stored on a computer-readable storage device.

Additional Embodiments

1. Using "Pause Islands" and Letter-Grouping Consistency Extremes in Evaluating Keyboard Biometric Authentication Performance When users type more than one word, even when continuously typing without unnatural pauses for thought or because of some external interruption, they inherently pause "over" spaces and punctuation—the keyboarding equivalent of taking a breath. A difficulty for many cadence-evaluating algorithms is that the duration and other descriptive statistics of these pauses are frequently quite dissimilar, and thus can have the effect of altering the overall conclusion about the fidelity of the current typing sample to the selected user's PCCHL.

For instance, in a password that contains a group of numeric characters, there may typically be a so-called "pause island" introduced as the user switches from using the alphanumeric portion of the keyboard to the numeric keypad for data entry.

Various embodiments enable the designation of selected pause characters (particularly spaces) as "timeouts," such that their presence in the current typing sample is required, but the associated typing numerics are ignored. The same tuning process also works at the other end of the consistency spectrum: in cases where individual letters (or pairs) are observed as always typed inconsistently (i.e., outside an expected coefficient of variance), the inconsistency can be designated as a requirement. In certain cases, paradoxically, any consistent typing behavior encountered in situations categorized as "typically inconsistent" would lower the comparison score.

Such embodiments can be particularly applicable to accommodating complex password requirements, which contain both reflexively typed text as well as characters that are produced through intentional keyboard use.

2. Combining Different Scoring Methods into a Single Process of Authenticating a Given User's Typing to Accomplish "Accident Forgiveness"

Various embodiments can be adjusted to tolerate variable degrees of non-conformity to the cadence authentication specifications. Such adjustments can be particularly useful in cases when users are required to employ passwords which are sufficiently complex that they do not readily lend themselves to typing using involuntary muscle movements, or if various physical human conditions make routinized typing difficult or impossible. This includes difficulty with a single character or a pair/group of characters, or any other problems with consistent typing behavior. These individual techniques address recurring islands of inconsistency in an otherwise highly consistent typed string.

Various embodiments of the disclosed cadence authentication processes are tunable. When a user enrolls into the cadence authentication system by entering typing samples into the PCCHL, the user can be presented with visual cues that can guide them to continue providing typing samples until determined thresholds of performance are met. The thresholds, (e.g., coefficient of variance, standard deviation, etc.), can vary by the application in which the cadence authentication process will be used. Thus, different standards of "tightness" are possible, based on the criticality of the application to the organization. In various embodiments, the cadence authentication processes use default settings, so that inexperienced users do not have to take the time to understand or alter the tuning parameters unless they so desire.

In various embodiments, the visual cues can take the form of a two-dimensional graphic comprising at least one circle, similar to a dartboard. See FIG. 8 for an example. Each typing sample can be displayed as a small dot in the graphic. The dots appearing inside the circle meet the requirements, while the dots appearing outside the circle do not.

During long periods of typing, users' patterns slow down or progressively change slightly, due to fatigue, experience, as well as other human and muscle-training factors. Various embodiments factor this pattern degradation automatically by accounting for predictably changing behavior. In various embodiments, the cadence authentication process can account for consistent progressive change in order to discern whether any differences in later performance numerics is a result of tiredness/familiarity—and not due to a change in user.

3. Supporting "Accident Forgiveness" by Variable Weighting of Letter-Grouping Importance Based on Normal Curve Distribution Characteristics when Determining Sample Match Probabilities Often, users have difficulties with just a small bit of typing—perhaps only a single character or pair/group of characters in a typing sample. If pan-string numerics can be characterized as "longitudinal," the information about single letters (or groups of single letters) can be characterized as "latitudinal". Highly focused latitudinal statistics, accumulated across many samples, can be rolled up into normal distributions of behavior. Optionally, the match algorithms can be set to consider these individual latitudinal variances, further sensitizing them to a user's typing habits, and thus making the results even more conforming to the user's own unique behavior, yet cognizant of small aberrations along the way.

In such embodiments, if a consistent inconsistency is detected in a small part of the samples used to create the profile, those corresponding measurements can be given little (or no weight) in the rendered conclusion.

4. Backspace-to-Overtype and "Double-Clutching" Non-Letter-Generating Keys to Avoid Spoofing Various embodiments can be set to either tolerate—or indeed to require—backspacing and overtyping such that the precise text required to satisfy the host application's password is properly delivered, yet its creation requires the use of hidden or more complex typing to create those final password string. For example, if a password were "Tom," various embodiments can mandate that those letters be typed as "T-o-n-<backspace>-m". Also, certain non-character generating keys (e.g., the Shift key) might be required to be pressed twice consecutively, etc. In both of these examples, no additional text is delivered to the host application—accordingly, the password needs are met for the host application's purposes—yet the cadence authentication process would recognize the hidden/required extra effort, and failure to provide that hidden effort would result in a failure score.

5. Using Multiple PCCHL to Account for Different Computers, Keyboards, Touch Surfaces, and Applications Users' habits of typing vary with the width, shape, and z-order (i.e., vertical key travel space) of the keyboard.

Various embodiments can automatically check multiple hardware libraries to compensate for these physical differences in hardware. Various embodiments can store two values: an ID (which can be provided by the client), and associated profile data. Each ID can be stored with a sub value, so that each ID can have multiple, discrete profiles. When a current typing sample is evaluated for authentication, all of the sub values for the given ID can automatically be checked. In such embodiments, there is no substantial difference to the host application in terms of implementation. These embodiments can have at least two different uses: supporting multiple hardware profiles for a single individual, or allowing a single ID to be shared by multiple authorized users. This latter case can be particularly useful to facilitate shared administrative accounts used by support personnel.

6. Improved Biometric Keyboard Authentication Using Heuristic Windowing of Sample Building Process, as Well as Auto-Start and Progressive Learning Techniques The PCCHL require typing samples to be useful. These typing samples can be compiled over time, or all at once. Both approaches are valid, and can be selected by the client to maximize users' ease of use. It is also possible to require continuous/perpetual sample accumulation.

Various windowed sample periods for typing sample accumulation can also be employed: by elapsed time (e.g., within the last week), by number of events (e.g., the last 10 entries), by an external data condition (e.g., service subscription renewal), by device (e.g., the user's laptop), or some combination thereof. Appropriate choice of these PCCHL-building options gives clients another opportunity to tune the performance of the cadence authentication algorithms to their specific security needs.

A possible operational benefit of these windowed sample periods is the "frictionless" accumulation of data. For example, embodiments using windowed sample periods can be installed and start working without requiring any PCCHL samples. In that case, until a statistically significant number of samples have been accumulated, the comparison results are simply reported back as inconclusive. Once the minimum sample threshold for the selected user has been obtained, the host application can begin using the cadence authentication algorithms to authenticate the selected user.

Additional Notes & Examples

The following examples pertain to further embodiments.

Example 1 may include subject matter (such as a method, means for performing acts, or machine readable medium including instructions that, when performed by a machine cause the machine to performs acts) comprising receiving data representative of a typing sample, the sample comprising a set of typing efforts of a user, the set of typing efforts representative of a string of keys typed by the user onto a keyboard; calculating a statistical summary of the typing sample representative data; and comparing, using geometric and geospatial constructs, the calculated statistical summary of the typing sample representative data to statistical summaries of representative data of previous typing samples in a stored profile of a selected user to generate an indication whether the user is the selected user.

In Example 2, the subject matter of Example 1 may optionally include, wherein the data representative of a typing effort comprise at least one of special key positions, KeyDown plus character plus time, KeyPress plus character plus time, KeyUp plus character plus time, and an identification object.

In Example 3, the subject matter of any of Examples 1-2 may optionally include, wherein calculating comprises assembling, for each typing effort in the typing sample, statistics comprising at least one of sequence, KeyUp minus KeyDown, overlap, overlap ordinal, KeyUp minus Last KeyUp, and KeyDown minus Last KeyUp; combining the assembled statistics for each typing effort of the sample; assembling a statistical summary of the sample, the statistical summary comprising at least one of count, average, coefficient of variance, average deviation, and standard deviation; and assembling a matrix of summarized statistics for the sample, the matrix comprising at least one of time between KeyUp and KeyDown, space between last KeyUp and next KeyDown, space between last KeyUp and current KeyUp, and standard deviation divided by average.

In Example 4, the subject matter of any of Examples 1-3 may optionally include, wherein comparing comprises assembling a matrix of summarized statistics for each previous typing sample in the stored profile of the selected user, the matrix comprising at least one of time between KeyUp and KeyDown, space between last KeyUp and next KeyDown, space between last KeyUp and current KeyUp, and standard deviation divided by average; and calculating a Pearson product-moment correlation coefficient between the matrix of summarized statistics for the sample and the matrix of summarized statistics for each previous typing sample in the stored profile of the selected user.

In Example 5, the subject matter of any of Examples 1-4 may optionally include, wherein comparing further comprises modifying the calculated Pearson product-moment correlation coefficient using parameterized weighting.

In Example 6, the subject matter of any of Examples 1-5 may optionally include, wherein the parameterized weighting is dependent upon externally configured values.

In Example 7, the subject matter of any of Examples 1-6 may optionally include, providing a visual representation of a comparison of the statistical summary of the typing sample representative data and the statistical summaries of previous typing samples of the selected user.

In Example 8, the subject matter of any of Examples 1-7 may optionally include, wherein the visual representation comprises at least one of a three-dimensional graphic, a Euclidean graphic, a vector graphic, a line graphic, an intersection graphic, and a mashup graphic.

In Example 9, the subject matter of any of Examples 1-8 may optionally include, wherein the geometric and geospatial constructs comprise Barycentric coordinate mathematics for computing pseudo-gravitational attraction parameters.

Example 10 may include, or may optionally be combined with the subject matter of any one of Examples 1-9 to include, subject matter (such as a method, means for performing acts, or machine readable storage medium including instructions that, when performed by a machine cause the machine to perform acts) comprising gathering data representative of a typing sample, the sample comprising a set of typing efforts of a user, the set of typing efforts representative of a string of keys typed by the user onto a keyboard; and receiving an indication whether the user is a selected user, wherein the indication has been generated by a comparison, using geometric and geospatial constructs, of a calculated statistical summary of the typing sample representative data to statistical summaries of representative data of previous typing samples in a stored profile of the selected user.

In Example 11, the subject matter of any of Examples 1-10 may optionally include, wherein the data representative of a typing effort comprise at least one of special key positions, KeyDown plus character plus time, KeyPress plus character plus time, KeyUp plus character plus time, and an identification object.

In Example 12, the subject matter of any of Examples 1-11 may optionally include, providing a visual representation of a comparison of the statistical summary of the typing sample representative data and the statistical summaries of previous typing samples of the selected user.

In Example 13, the subject matter of any of Examples 1-12 may optionally include, wherein the visual representation comprises at least one of a three-dimensional graphic, a Euclidean graphic, a vector graphic, a line graphic, an intersection graphic, and a mashup graphic.

In Example 14, the subject matter of any of Examples 1-13 may optionally include, wherein the geometric and geospatial constructs comprise Barycentric coordinate mathematics for computing pseudo-gravitational attraction parameters.

Example 15 may include, or may optionally be combined with the subject matter of any one of Examples 1-14 to include, subject matter (such as a system, apparatus, or device) comprising a processor and a memory device. The subject matter of Example 15 may also include a set of instructions stored in the memory device and executable by the processor to receive data representative of a typing sample, the sample comprising a set of typing efforts of a user, the set of typing efforts representative of a string of keys typed by the user onto a keyboard; calculate a statistical summary of the typing sample representative data; and compare, using geometric and geospatial constructs, the calculated statistical summary of the typing sample representative data to statistical summaries of representative data of previous typing samples in a stored profile of a selected user to generate an indication whether the user is the selected user.

In Example 16, the subject matter of any of Examples 1-15 may optionally include, wherein the data representative of a typing effort comprise at least one of special key positions, KeyDown plus character plus time, KeyPress plus character plus time, KeyUp plus character plus time, and an identification object.

In Example 17, the subject matter of any of Examples 1-16 may optionally include, wherein the instructions for calculating comprise instructions to assemble, for each typing effort in the typing sample, statistics comprising at least one of sequence, KeyUp minus KeyDown, overlap, overlap ordinal, KeyUp minus Last KeyUp, and KeyDown minus Last KeyUp; combine the assembled statistics for each typing effort of the sample; assemble a statistical summary of the sample, the statistical summary comprising at least one of count, average, coefficient of variance, average deviation, and standard deviation; and assemble a matrix of summarized statistics for the sample, the matrix comprising at least one of time between KeyUp and KeyDown, space between last KeyUp and next KeyDown, space between last KeyUp and current KeyUp, and standard deviation divided by average.

In Example 18, the subject matter of any of Examples 1-17 may optionally include, wherein the instructions for comparing comprise instructions to assemble a matrix of summarized statistics for each previous typing sample in the stored profile of the selected user, the matrix comprising at least one of time between KeyUp and KeyDown, space between last KeyUp and next KeyDown, space between last KeyUp and current KeyUp, and standard deviation divided by average; and calculate a Pearson product-moment correlation coefficient between the matrix of summarized statistics for the sample and the matrix of summarized statistics for each previous typing sample in the stored profile of the selected user.

In Example 19, the subject matter of any of Examples 1-18 may optionally include, wherein the instructions for comparing further comprise instructions to modify the calculated Pearson product-moment correlation coefficient using parameterized weighting.

In Example 20, the subject matter of any of Examples 1-19 may optionally include, wherein the instructions to modify using parameterized weighting use externally configured values.

Although several embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method performed by a computing device, the method comprising:
   receiving data representative of a current typing sample, the current typing sample comprising a set of typing efforts of a user, the set of typing efforts representative of a string of keys typed by the user onto a keyboard coupled to a computing device, the set of typing efforts including timing data corresponding to keystrokes made by the user in typing the string of keys;
   assembling statistics for each typing effort in the current typing sample;
   combining the assembled statistics into a statistical summary of the current typing sample;
   comparing, using geometric and geospatial constructs including Barycentric coordinate calculations for computing pseudo-gravitational attraction parameters, the statistical summary of the current typing sample to statistical summaries of previous typing samples in a stored profile of a selected user;
   generating, based on the comparing, an indication whether the user is the selected user;
   determining whether the generated indication is within a threshold; and
   allowing the user access to the computing device based on the generated indication.

2. The method of claim 1, wherein the data representative of a typing effort comprises at least one of: special key positions, KeyDown plus character plus time, KeyPress plus character plus time, KeyUp plus character plus time, and an identification object.

3. The method of claim 2,
   wherein a statistic for a typing effort in the current typing sample comprises at least one of: sequence, KeyUp minus KeyDown, overlap, overlap ordinal, KeyUp minus Last KeyUp, and KeyDown minus Last KeyUp; and
   wherein the statistical summary of the current typing sample comprises at least one of: count, average, coefficient of variance, average deviation, and standard deviation.

4. The method of claim 3,
   wherein the statistical summary for the current typing sample comprises at least one of: time between KeyUp and KeyDown, space between last KeyUp and next KeyDown, space between last KeyUp and current KeyUp, and standard deviation divided by average; and
   wherein a statistical summary in the statistical summaries of previous typing samples comprises at least one of: time between KeyUp and KeyDown, space between last KeyUp and next KeyDown, space between last KeyUp and current KeyUp, and standard deviation divided by average; and
   calculating a Pearson product-moment correlation coefficient (PPMCC) between the statistical summary for the current typing sample and the statistical summaries of previous typing samples in the stored profile of the selected user.

5. The method of claim 4, further comprising:
   modifying the calculated PPMCC using parameterized weighting.

6. The method of claim 5, wherein the parameterized weighting is dependent upon externally configured values.

7. The method of claim 1, further comprising:
   providing a visual representation of a comparison of the statistical summary of the current typing sample representative data and the statistical summaries of previous typing samples in the stored profile of the selected user.

8. The method of claim 7, wherein the visual representation comprises at least one of: a three-dimensional graphic, a Euclidean graphic, a vector graphic, a line graphic, an intersection graphic, and a mashup graphic.

9. A machine-readable storage device having instructions stored thereon to cause a specifically programmed machine to perform operations comprising:
   gathering data representative of a current typing sample, the current typing sample comprising a set of typing efforts of a user, the set of typing efforts representative of a string of keys typed by the user onto a keyboard coupled to a computing device, the set of typing efforts including timing data corresponding to keystrokes made by the user in typing the string of keys;
   assembling statistics for each typing effort in the current typing sample;
   combining the assembled statistics into a statistical summary of the current typing sample;
   comparing, using geometric and geospatial constructs including Barycentric coordinate calculations for computing pseudo-gravitational attraction parameters, the statistical summary of the current typing sample to statistical summaries of previous typing samples in a stored profile of a selected user;
   generating, based on the comparing, an indication whether the user is the selected user;
   determining whether the generated indication is within a threshold; and
   allowing the user access to the computing device based on the generated indication.

10. The machine-readable storage device of claim 9, wherein the data representative of a typing effort comprises at least one of: special key positions, KeyDown plus character plus time, KeyPress plus character plus time, KeyUp plus character plus time, and an identification object.

11. The machine-readable storage device of claim 9, the operations further comprising:
    providing a visual representation of a comparison of the statistical summary of the current typing sample representative data and the statistical summaries of previous typing samples in the stored profile of the selected user.

12. The machine-readable storage device of claim 11, wherein the visual representation comprises at least one of: a three-dimensional graphic, a Euclidean graphic, a vector graphic, a line graphic, an intersection graphic, and a mashup graphic.

13. A system comprising:
a processor;
a memory device; and
a set of instructions stored in the memory device and executable by the processor to:
receive data representative of a current typing sample, the current typing sample comprising a set of typing efforts of a user, the set of typing efforts representative of a string of keys typed by the user onto a keyboard coupled to a system, the set of typing efforts including timing data corresponding to keystrokes made by the user in typing the string of keys;
assemble statistics for each typing effort in the current typing sample;
combine the assembled statistics into a statistical summary of the current typing sample;
compare, using geometric and geospatial constructs including Barycentric coordinate calculations for computing pseudo-gravitational attraction parameters, the statistical summary of the current typing sample to statistical summaries of previous typing samples in a stored profile of a selected user;
generate, based on the comparing, an indication whether the user is the selected user;
determine whether the generated indication is within a threshold; and
allow the user access to the system based on the generated indication.

14. The system of claim 13, wherein the data representative of a typing effort comprises at least one of: special key positions, KeyDown plus character plus time, KeyPress plus character plus time, KeyUp plus character plus time, and an identification object.

15. The system of claim 14, wherein
a statistic for a typing effort in the current typing sample comprises at least one of:
sequence, KeyUp minus KeyDown, overlap, overlap ordinal, KeyUp minus Last KeyUp, and KeyDown minus Last KeyUp; and
wherein the statistical summary of the current typing sample comprises at least one of: count, average, coefficient of variance, average deviation, and standard deviation.

16. The system of claim 15,
wherein the statistical summary for the current typing sample comprises at least one of: time between KeyUp and KeyDown, space between last KeyUp and next KeyDown, space between last KeyUp and current KeyUp, and standard deviation divided by average; and
wherein a statistical summary in the statistical summaries of previous typing samples comprises at least one of: time between KeyUp and KeyDown, space between last KeyUp and next KeyDown, space between last KeyUp and current KeyUp, and standard deviation divided by average; and
calculating a Pearson product-moment correlation coefficient (PPMCC) between the statistical summary for the current typing sample and the statistical summaries of previous typing samples in the stored profile of the selected user.

17. The system of claim 16, wherein the set of instructions are further executable by the processor to:
modify the calculated PPMCC using parameterized weighting.

18. The system of claim 17, wherein the instructions to modify using parameterized weighting use externally configured values.

19. The machine-readable storage device of claim 10,
wherein a statistic for a typing effort in the current typing sample comprises at least one of: sequence, KeyUp minus KeyDown, overlap, overlap ordinal, KeyUp minus Last KeyUp, and KeyDown minus Last KeyUp; and
wherein the statistical summary of the current typing sample comprises at least one of: count, average, coefficient of variance, average deviation, and standard deviation.

20. The machine-readable storage device of claim 19,
wherein the statistical summary for the current typing sample comprises at least one of: time between KeyUp and KeyDown, space between last KeyUp and next KeyDown, space between last KeyUp and current KeyUp, and standard deviation divided by average; and
wherein a statistical summary in the statistical summaries of previous typing samples comprises at least one of: time between KeyUp and KeyDown, space between last KeyUp and next KeyDown, space between last KeyUp and current KeyUp, and standard deviation divided by average; and
calculating a Pearson product-moment correlation coefficient (PPMCC) between the statistical summary for the current typing sample and the statistical summaries of previous typing samples in the stored profile of the selected user.

* * * * *